United States Patent
Delling et al.

(10) Patent No.: US 10,062,188 B2
(45) Date of Patent: Aug. 28, 2018

(54) CUSTOMIZABLE ROUTE PLANNING USING GRAPHICS PROCESSING UNIT

(71) Applicant: Microsoft Corporation, Redmond, WA (US)

(72) Inventors: Daniel Delling, Sunnyvale, CA (US); Renato F. Werneck, San Francisco, CA (US); Moritz Helge Kobitzsch, Karlsruhe (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 14/296,644

(22) Filed: Jun. 5, 2014

(65) Prior Publication Data

US 2015/0356759 A1 Dec. 10, 2015

(51) Int. Cl.
*G06T 11/20* (2006.01)
*G06T 1/20* (2006.01)
*G01C 21/34* (2006.01)

(52) U.S. Cl.
CPC ........ *G06T 11/206* (2013.01); *G01C 21/3446* (2013.01); *G06T 1/20* (2013.01)

(58) Field of Classification Search
CPC .................. G01C 21/3446; G01C 21/3453
See application file for complete search history.

(56) References Cited

U.S. PATENT DOCUMENTS

| | | | |
|---|---|---|---|
| 6,278,942 B1 * | 8/2001 | McDonough | G01C 21/3415 701/416 |
| 8,364,717 B2 | 1/2013 | Delling et al. | |
| 2003/0031177 A1 * | 2/2003 | Robidas | H04J 3/12 370/392 |
| 2004/0032831 A1 * | 2/2004 | Matthews | H04J 14/0227 370/238 |
| 2010/0023251 A1 * | 1/2010 | Gale | G01C 21/00 701/533 |
| 2010/0045682 A1 * | 2/2010 | Ford | G06F 9/30076 345/502 |
| 2010/0076941 A1 * | 3/2010 | Dotsenko | G06F 17/10 707/705 |
| 2010/0141666 A1 * | 6/2010 | Christopher | G06T 13/20 345/520 |
| 2012/0179674 A1 * | 7/2012 | Delling | G06F 17/30533 707/736 |
| 2012/0232787 A1 * | 9/2012 | Kunath | G01C 21/3461 701/423 |

(Continued)

OTHER PUBLICATIONS

Efficient Routing in Road Networks with Turn Costs, Geisberger et al, May 7, 2011, SEA'11 Proceedings of the 10th international conference on Experimental algorithms.*

(Continued)

*Primary Examiner* — Jitesh Patel

(74) *Attorney, Agent, or Firm* — Jonathan M. Waldman

(57) ABSTRACT

Customizable route planning is a technique for computing point-to-point shortest paths in road networks. It includes three phases: preprocessing, metric customization, and queries. A graphics processing unit may be used, e.g., in the metric customization phase, to make customization even faster, enabling a wide range of applications including highly dynamic applications and on-line personalized cost functions.

15 Claims, 13 Drawing Sheets

(56) References Cited

U.S. PATENT DOCUMENTS

| | | | | |
|---|---|---|---|---|
| 2012/0250535 | A1* | 10/2012 | Delling | H04L 45/12 370/252 |
| 2012/0254153 | A1* | 10/2012 | Abraham | G01C 21/3446 707/716 |
| 2012/0310523 | A1* | 12/2012 | Delling | G01C 21/3484 701/411 |
| 2013/0132369 | A1* | 5/2013 | Delling | G01C 21/3446 707/716 |
| 2013/0179067 | A1* | 7/2013 | Trowbridge | G01C 21/34 701/410 |
| 2013/0231862 | A1* | 9/2013 | Delling | G01C 21/34 701/527 |
| 2014/0107921 | A1 | 4/2014 | Delling et al. | |
| 2014/0222729 | A1* | 8/2014 | Dasgupta | G06N 99/005 706/12 |

OTHER PUBLICATIONS

Route Planning in Road Networks with Turn Costs, Lars Volker, Jul. 22, 2008.*

"International Search Report & Written Opinion Received for PCT Application No. PCT/US2015/033872", dated Sep. 2, 2015, 11 Pages.

"Second Written Opinion Issued in PCT Application No. PCT/US2015/033872", dated Apr. 21, 2016, 6 Pages.

Perumalla, et al., "GPU-based Real-Time Execution of Vehicular Mobility Models in Large-Scale Road Network Scenarios", In ACM/IEEE/SCS 23rd Workshop on Principles of Advanced and Distributed Simulation, Jun. 22, 2009, 9 pages.

Shen, et al., "Agent-based Traffic Simulation and Traffic Signal Timing Optimization with GPU", In 14th International IEEE Conference on Intelligent Transportation Systems, Oct. 5, 2011, 6 pages.

Bleiweiss, Avi, "GPU Accelerated Pathfinding", In Proceedings of the 23rd ACM Siggraph/Eurographics symposium on Graphics hardware, Jun. 20, 2008, 10 pages.

"GPU-Accelerated Route Planning", Published on: Aug. 2005, Available at: https://www.cs.unc.edu/cms/research/summaries/GPUAcceleratedRoutePlanning.pdf.

Karpinski, et al., "Multi-GPU parallel memetic algorithm for capacitated vehicle routing problem", In Proceedings of Distributed, Parallel, and Cluster Computing, Jan. 21, 2014, 12 pages.

Efentakis, et al., "Optimizing Landmark-Based Routing and Preprocessing", In Proceedings of the Sixth ACM SIGSPATIAL International Workshop on Computational Transportation Science, Nov. 5, 2013, 6 pages.

U.S. Appl. No. 13/649,114, Delling, et al., "Query Scenarios for Customizable Route Planning", Filed Date: Oct. 11, 2012.

Abraham, et al., "Hierarchical Hub Labelings for Shortest Paths", In Technical Report MSR-TR-MSR-TR-2012-46, Apr. 2012, 15 pages.

Bast, et al., "Route Planning in Transportation Networks", In Technical Report MSR-TR-2014-4, Jan. 8, 2014, 57 pages.

Bast, et al., "Fast Routing in Road Networks with Transit Nodes", In Proceedings of Science, vol. 316, No. 5824, Apr. 27, 2007, p. 566.

Cormen, et al., "Introduction to Algorithms", The MIT Press, Jul. 31, 2009, 43 pages.

Delling, et al., "PHAST: Hardware-Accelerated Shortest Path Trees", In Journal of Parallel and Distributed Computing, vol. 73, No. 7, Jul. 2013, 11 pages.

Delling, et al., "Customizable Route Planning", In Proceedings of the 10th International Symposium on Experimental Algorithms, May 2011, pp. 1-12.

Delling, et al., "Customizable Route Planning in Road Networks", In Proceedings of the Sixth Annual Symposium on Combinatorial Search, Jul. 11, 2013, pp. 1-31.

Delling, et al., "Graph Partitioning with Natural Cuts", In Proceedings of the IEEE International Parallel & Distributed Processing Symposium, May 16, 2011, 15 pages.

Delling, et al., "Faster Customization of Road Networks", In Proceedings of the 12th International Symposium on Experimental Algorithms, Jun. 5, 2013, pp. 1-12.

Delling, et al., "The Shortest Path Problem: Ninth DIMACS Implementation Challenge", In Proceedings of DIMACS Series in Discrete Mathematics and Theoretical Computer Science, Jul. 28, 2009, 3 pages.

Geisberger, et al., "Exact Routing in Large Road Networks using Contraction Hierarchies", In Proceedings of Transportation Science, vol. 46, No. 3, Aug. 2012, 2 pages.

Geisberger, et al., "Efficient Routing in Road Networks with Turn Costs", In Proceedings of the 10th International Conference on Experimental Algorithms, May 5, 2011, 12 pages.

Kohler, et al., "Fast Point-to-Point Shortest Path Computations with Arc-Flags", In Proceedingsof Shortest Path Computations: Ninth DIMACS Challenge, vol. 24 of DIMACS Book. American Mathematical Society, Nov. 13, 2006, pp. 1-27.

Holzer, et al., "Engineering Multilevel Overlay Graphs for Shortest-Path Queries", In ACM Journal of Experimental Algorithmics, vol. 13, Sep. 2008, 26 pages.

Madduri, et al., "Parallel Shortest Path Algorithms for Solving Large-Scale Instances", In Proceedings of 9th DIMACS Implementation Challenge—The Shortest Path Problem, Aug. 30, 2006, pp. 1-39.

Martin, et al., "CUDA Solutions for the SSSP Problem", In Proceedings of 9th International Conference Baton Rouge, May 25, 2009, 4 pages.

Meyer, et al., "D-Stepping: A Parallelizable Shortest Path Algorithm", In Journal of Algorithms, vol. 49, Issue 1, Oct. 2003, pp. 114-152.

Ortega-Arranz, et al., "A New GPU-based Approach to the Shortest Path Problem", In Proceedings of International Conference on High Performance Computing and Simulation, Jul. 1, 2013, 7 pages.

Sommer, Christian, "Shortest-Path Queries in Static Networks", In Proceedingsof ACM Computing Surveys, Retrieved on: Apr. 7, 2014, 35 pages.

"International Preliminary Report on Patentability Issued in PCT Application No. PCT/US2015/033872", dated Jul. 1, 2016, 6 Pages.

* cited by examiner

CUSTOMIZABLE ROUTE PLANNING USING GRAPHICS PROCESSING UNIT

BACKGROUND

Existing computer programs known as road-mapping programs provide digital maps, often complete with detailed road networks down to the city-street level. Typically, a user can input a location and the road-mapping program will display an on-screen map of the selected location. Several existing road-mapping products typically include the ability to calculate a best route between two locations. In other words, the user can input two locations, and the road-mapping program will compute the travel directions from the source location to the destination location. The directions are typically based on distance, travel time, etc. Computing the best route between locations may require significant computational time and resources.

Some road-mapping programs compute shortest paths using variants of a well known method attributed to Dijkstra. Note that in this sense "shortest" means "least cost" because each road segment is assigned a cost or weight not necessarily directly related to the road segment's length. By varying the way the cost is calculated for each road, shortest paths can be generated for the quickest, shortest, or preferred routes. Dijkstra's original method, however, is not always efficient in practice, due to the large number of locations and possible paths that are scanned. Instead, many known road-mapping programs use heuristic variations of Dijkstra's method.

More recent developments in road-mapping algorithms utilize a two-stage process comprising a preprocessing phase and a query phase. During the preprocessing phase, the graph or map is subject to an off-line processing such that later real-time queries between any two destinations on the graph can be made more efficiently. Known examples of preprocessing algorithms use geometric information, hierarchical decomposition, and A* search combined with landmark distances.

Most previous research focused on a metric directed to driving times. Real-world systems, however, often support other metrics such as shortest distance, walking, biking, avoiding U-turns, avoiding freeways, preferring freeways, or avoiding left turns, for example. Current road-mapping techniques are not adequate in such scenarios. The preprocessing phase is rerun for each new metric, and query times may not be competitive for metrics with weak hierarchies. The preprocessing phase can be costly, limiting the ability to incorporate new optimization functions, including traffic information and personal preferences.

SUMMARY

A point-to-point shortest path technique is described that supports real-time queries and fast metric update or replacement (also referred to as metric customization). Arbitrary metrics (cost functions) are supported without significant degradation in performance. Examples of metrics include current (real-time) traffic speeds, a truck with height, weight, and speed restrictions, user-specific customization, etc.

In an implementation, determining a shortest path between two locations uses three stages: a preprocessing stage, a metric customization stage, and a query stage. Preprocessing is based on a graph structure only, while metric customization augments preprocessing results taking edge costs into account. A graph may comprise a set of vertices (representing intersections) and a set of edges or arcs (representing road segments). Additional data structures may be used to represent turn restrictions and penalties.

In an implementation, techniques may be performed on a graphics processing unit (GPU). A GPU can be used in a metric customization phase, e.g., to increase the performance of the various techniques described herein.

In an implementation, the preprocessing partitions the graph into loosely connected components (or cells) of bounded size and creates an overlay graph by replacing each component with a "clique" (complete graph) connecting its boundary vertices. The preprocessing phase does not take edge costs into account, and is therefore metric-independent. Clique edge lengths are computed during the customization phase and stored separately. The customization phase can be performed in the GPU for various different metrics, and produces a small amount of data for each.

In an implementation, the query phase is run using the metric-independent data together with the relevant metric-specific data. The query phase may use a bidirectional version of Dijkstra's algorithm operating on the union of the overlay graph and the components of the original graph containing the origin and the destination. Multiple overlay levels may be used to achieve further speedup.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
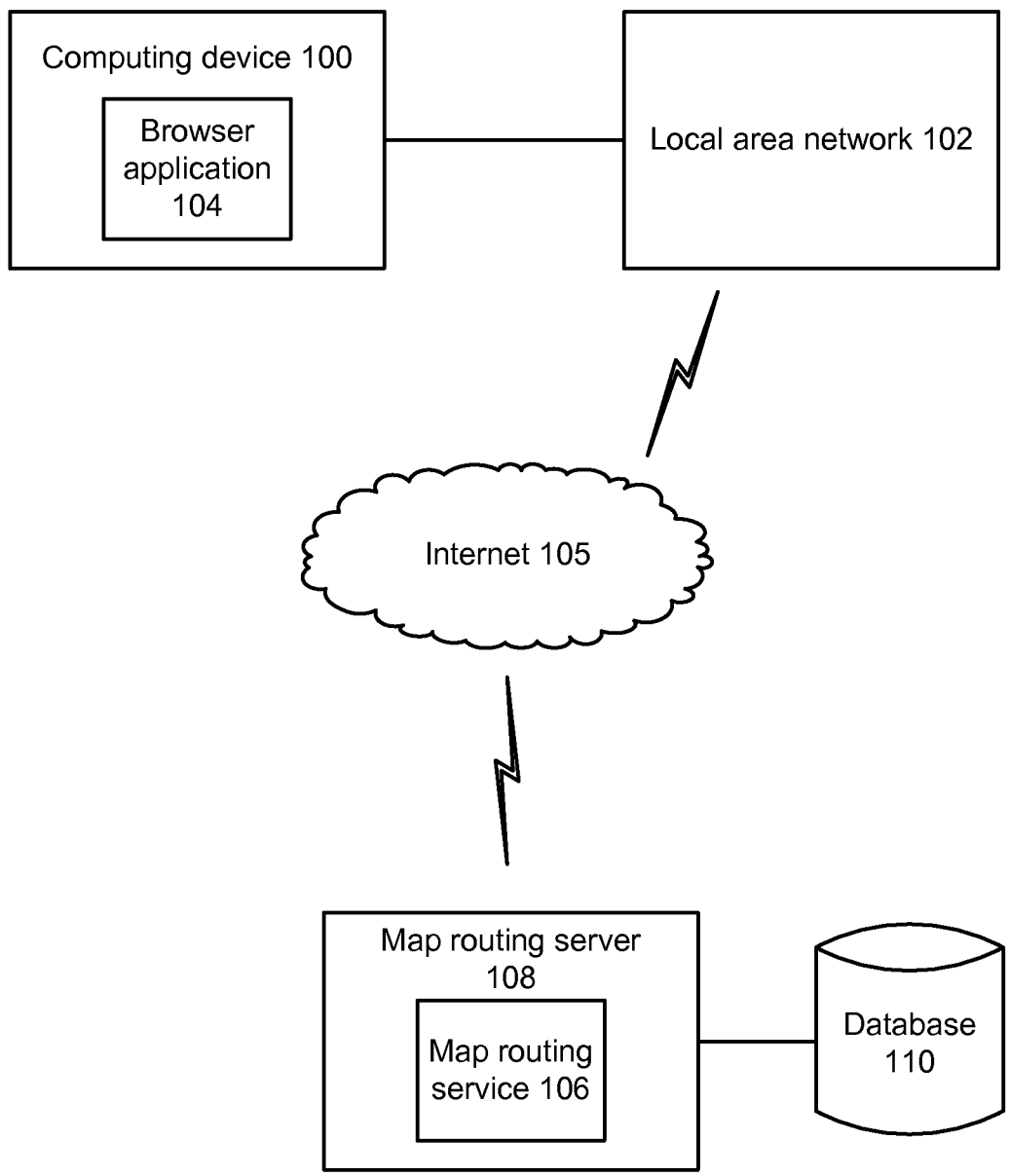
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not specifically shown) facilitating communications over a communications medium. Example computing devices include personal computers (PCs), mobile communication devices, etc. In some implementations, the computing device 100 may include a desktop personal computer, workstation, laptop, PDA (personal digital assistant), smart phone, cell phone, or any WAP-enabled device or any other computing device capable of interfacing directly or indirectly with a network. An example computing device 100 is described with respect to the computing device 1300 of FIG. 13, for example.

The computing device 100 may communicate with a local area network 102 via a physical connection. Alternatively, the computing device 100 may communicate with the local area network 102 via a wireless wide area network or wireless local area network media, or via other communications media. Although shown as a local area network 102, the network may be a variety of network types including the public switched telephone network (PSTN), a cellular telephone network (e.g., 3G, 4G, CDMA, etc.), and a packet switched network (e.g., the Internet). Any type of network and/or network interface may be used for the network.

The user of the computing device 100, as a result of the supported network medium, is able to access network resources, typically through the use of a browser application 104 running on the computing device 100. The browser application 104 facilitates communication with a remote network over, for example, the Internet 105. One exemplary network resource is a map routing service 106, running on a map routing server 108. The map routing server 108 hosts a database 110 of physical locations and street addresses, along with routing information such as adjacencies, distances, speed limits, and other relationships between the stored locations. The database 110 may also store information pertaining to metrics.

A user of the computing device 100 typically enters start and destination locations as a query request through the browser application 104. The map routing server 108 receives the request and produces a shortest path among the locations stored in the database 110 for reaching the destination location from the start location. The map routing server 108 then sends that shortest path back to the requesting computing device 100. Alternatively, the map routing service 106 is hosted on the computing device 100, and the computing device 100 need not communicate with a local area network 102.

The point-to-point (P2P) shortest path problem is a classical problem with many applications. Given a graph G with non-negative arc lengths as well as a vertex pair (s,t), the goal is to find the distance from s to t. The graph may represent a road map, for example. For example, route planning in road networks solves the P2P shortest path problem. However, there are many uses for an algorithm that solves the P2P shortest path problem, and the techniques, processes, and systems described herein are not meant to be limited to maps.

Thus, a P2P algorithm that solves the P2P shortest path problem is directed to finding the shortest distance between any two points in a graph. Such a P2P algorithm may comprise several stages including a preprocessing stage and a query stage. The preprocessing phase may take as an input a directed graph. Such a graph may be represented by G=(V,E), where V represents the set of vertices in the graph and E represents the set of edges or arcs in the graph. The graph comprises several vertices (points), as well as several edges. On a road network, the vertices may represent intersections, and the edges may represent road segments. The preprocessing phase may be used to improve the efficiency of a later query stage, for example.

During the query phase, a user may wish to find the shortest path between two particular nodes. The origination node may be known as the source vertex, labeled s, and the destination node may be known as the target vertex labeled t. For example, an application for the P2P algorithm may be to find the shortest distance between two locations on a road map. Each destination or intersection on the map may be represented by one of the nodes, while the particular roads and highways may be represented by an edge. The user may then specify their starting point s and their destination t. Alternatively, s and t may be points along arcs as well. The techniques described herein may also be used if the start and destination are not intersections, but points alongside a road segment (e.g., a particular house on a street).

Thus, to visualize and implement routing methods, it is helpful to represent locations and connecting segments as an abstract graph with vertices and directed edges. Vertices correspond to locations, and edges correspond to road segments between locations. The edges may be weighted according to the travel distance, transit time, and/or other criteria about the corresponding road segment. The general terms "length" and "distance" are used in context to encompass the metric by which an edge's weight or cost is measured. The length or distance of a path is the sum of the weights of the edges contained in the path. For manipulation by computing devices, graphs may be stored in a contiguous block of computer memory as a collection of records, each record representing a single graph node or edge along with some associated data. Not all the data must be stored with the graph; for example, the actual edge weights may be stored separately.

Arcs and turns have properties such as physical length, speed limit, height or weight restriction, tolls, road category (e.g., highway, rural road, etc.), turn type (e.g., "left turn with stop sign", etc.). A metric is a function that maps properties to costs, such as fastest, shortest, avoid highways, avoid tolls, no U-turns, etc. Metrics may share the same underlying graph.

For customizable route planning, real-time queries may be performed on road networks with arbitrary metrics. Such techniques can be used to keep several active metrics at once (e.g., to answer queries for any of them), or so that new metrics can be generated on the fly, for example. Customizable route planning supports real-time traffic updates and other dynamic query scenarios, allows arbitrary metric customization, and can provide personalized driving directions (for example, for a truck with height and weight restrictions).

The information associated with the network can be split into two elements: the topology and a metric. The topology includes the set of vertices (intersections) and edges (road segments), and how they relate to one another. It also includes a set of static properties of each road segment or turn, such as physical length, road category, speed limits, and turn types. A metric encodes the actual cost of traversing a road segment (i.e., an edge) or taking a turn. A metric may be described compactly, as a function that maps (in constant time) the static properties of an edge or turn into a cost. As used herein, the topology is shared by the metrics and rarely changes, while metrics may change often and may coexist.

Figure 2:
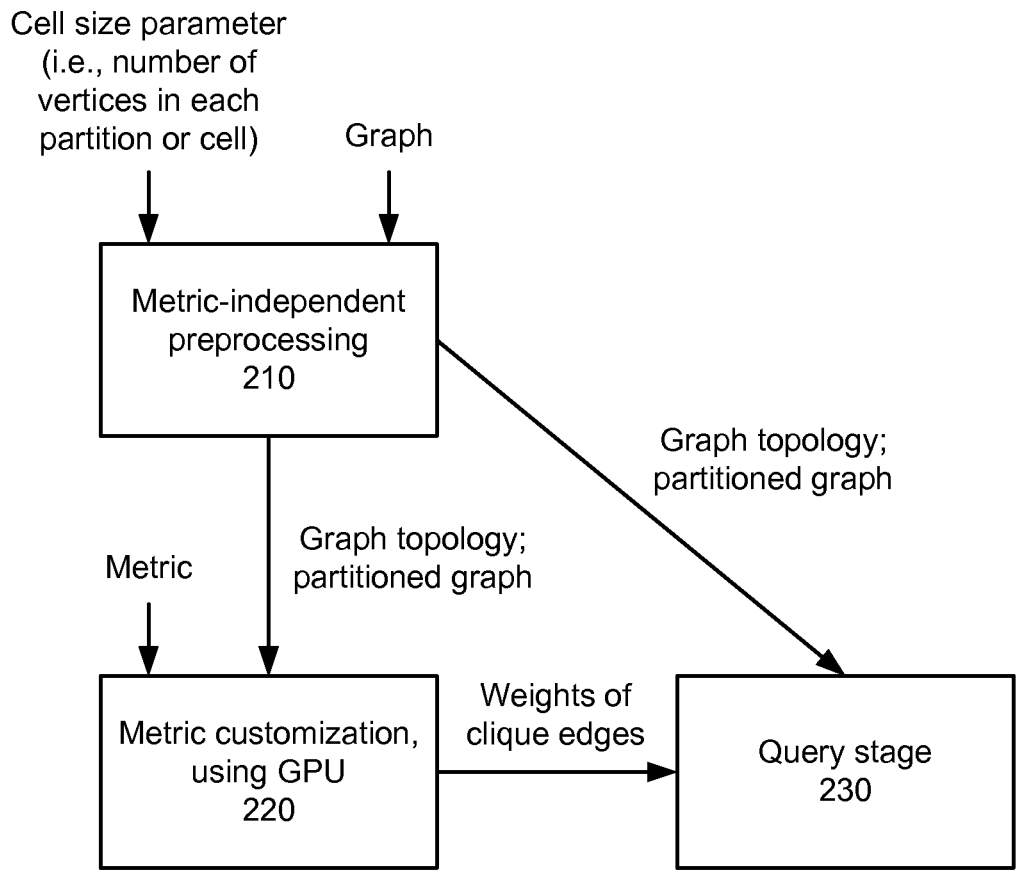
FIG. 2 is a diagram illustrating three stages of an implementation of customizable route planning.

Techniques for customizable route planning comprise three stages, as shown in the high level diagram of FIG. 2. A first stage, at 210, is referred to as metric-independent preprocessing. This preprocessing takes the graph topology as input, and may produce a fair amount of auxiliary data (comparable to the input size).

The second stage, at 220, is metric customization and may be performed using the GPU. Metric customization is run once for each metric, is fast (e.g., on the order of a few seconds), and produces little data—an amount that is a small fraction of the original graph. One of the inputs to the metric customization stage is a description of the metric. In this manner, the metric customization knows (implicitly or explicitly) the cost of every road segment or turn.

The third stage, at 230, is the query stage. The query stage uses the outputs of the first two stages and is fast enough for real-time applications.

A metric customization technique may be used in the determination of point-to-point shortest paths. In implementations, the metric customization time, the metric-dependent space (excluding the original graph), and the query time, are minimized. Although examples herein may refer to travel times and travel distances, the techniques may be used for any metric.

Thus, the initial preprocessing phase is metric-independent: it takes as input only the graph topology. The customization phase takes as input the cost function (metric) and the output of the previous phase. Queries use the outputs of both phases to compute point-to-point shortest paths. Queries are just fast enough (milliseconds rather than microseconds) for interactive applications, but a new cost function can be incorporated in mere seconds (by running only the customization phase), enabling the techniques herein to handle frequent traffic updates, for example, to compute driving directions.

As described further herein, GPUs can be used to accelerate customization even further. In an implementation, data structures may be set up on the GPU during the metric-independent preprocessing, such that only a few GPU kernels are invoked when a metric change occurs. This enables a high amount of personalization. For example, one could define a cost function at query time and still obtain driving directions in a fraction of a second. GPUs can make customization faster, and also more energy-efficient than central processing unit (CPU)-based (even multicore) implementations.

Figure 3:
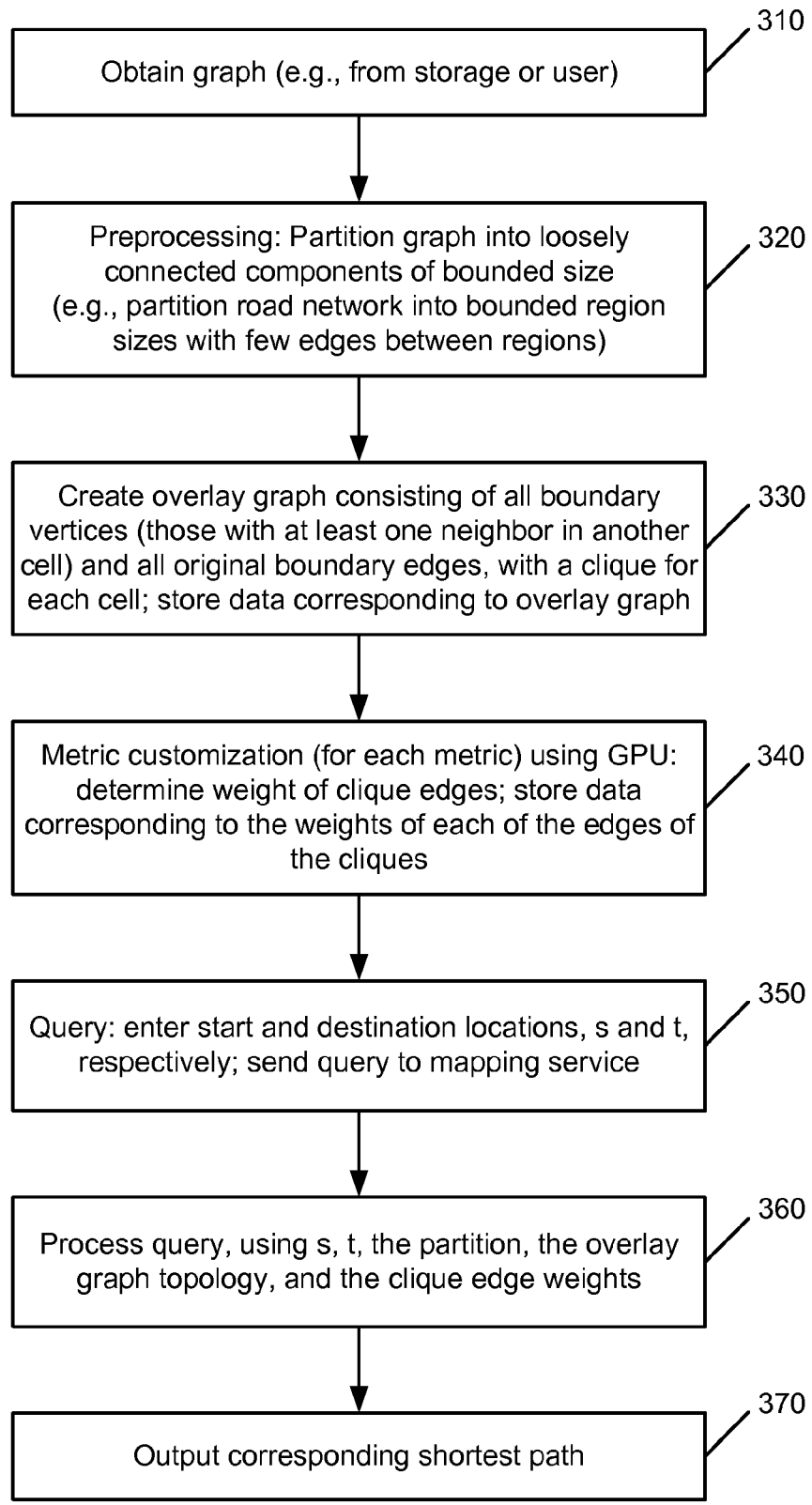
FIG. 3 is an operational flow of an implementation of a method using a metric customization technique for determining a shortest path between two locations.

FIG. 3 is an operational flow of an implementation of a method 300 using a metric customization technique for determining a shortest path between two locations. At 310, a graph is obtained, e.g., from storage or from a user.

During a preprocessing stage, the graph is partitioned into loosely connected components of bounded size at 320. In an implementation, this operation partitions the road network into bounded region sizes with few edges between regions. At 330, an overlay graph is created by replacing each component with a complete graph (a "clique") connecting its boundary vertices. Preprocessing performs the partition and builds the overlay graph (i.e., the cliques), but without taking edge weights into account. Thus, at 330, an overlay graph is created, comprising the boundary vertices (those with at least one neighbor in another cell) and the original boundary edges, together with a clique for each cell.

More particularly, given the graph G(V,E) as an input along with an input parameter U, a partition into cells with at most U vertices each is generated with as few boundary arcs (arcs with endpoints in different cells) as possible, and an overlay graph is created. This preprocessing stage is metric-independent and ignores edge costs.

Any known method, such as the well known PUNCH technique, may be used to partition the graph. Recently developed to deal with road networks, PUNCH routinely finds solutions with half as many boundary edges (or fewer), compared to the general-purpose partitioners (such as METIS) commonly used by previous algorithms. Better partitions reduce customization time and space, leading to faster queries.

The overlay graph H created during preprocessing contains all boundary vertices in the partition, i.e., all vertices with at least one neighbor in another cell. It also includes all boundary edges (i.e., every edge whose endpoints are in different cells). Finally, for each cell C, it contains a complete graph (a clique) between its boundary vertices. For every pair (v,w) of boundary vertices in C, H contains an arc (v,w).

The preprocessing is based on the graph structure without any edge costs, while subsequent GPU-based metric customization augments the preprocessing results by taking edge costs into account. For the customization stage, the distances between the boundary nodes in each cell are determined. Therefore, during a metric customization stage, given the input of graph G=(V,E), a partition of V, and the overlay graph topology, the weights of clique edges are determined. Clique edge weights (i.e., lengths) are thus computed during the customization phase (i.e., the metric customization stage assigns weights to the edges of the cliques). This stage can be repeated for various different metrics, and produces a small amount of data for each.

More particularly, during the metric customization stage, at 340, for every pair (v, w) of boundary vertices in C, the cost of the clique arc (v, w) is set to the length of the shortest path (restricted to C) between v and w (or infinite if w is not reachable from v). This may be performed by running a Dijkstra computation from each boundary vertex u restricted to the cell containing u. Note that, with these costs, H is an overlay: the distance between any two vertices in H is the same as in G. Thus, by separating metric customization from graph partitioning, new metrics may be processed quickly.

At query time, at 350, a user enters start and destination locations, s and t, respectively (e.g., using the computing device 100), and the query (e.g., the information pertaining to the s and t vertices) is sent to a mapping service (e.g., the map routing service 106). The s-t query is processed at 360 using the partition, the overlay graph topology, and the clique edge weights. Depending on the implementation, one can have arbitrarily many queries after a single customization operation. The query is processed using the metric-independent data together with the relevant metric-specific data. A bidirectional version of Dijkstra's algorithm is performed on the union of the overlay graph H and the components of the original graph G containing the origin and the destination. (A unidirectional algorithm can also be used.) Thus, to perform a query between s and t, run a bidirectional version of Dijkstra's algorithm on the graph consisting of the union of H, $C_s$, and $C_t$. (Here $C_v$ denotes the subgraph of G induced by the vertices in the cell containing v.) This graph is much smaller than the input graph, leading to fast queries. The corresponding path (the distance between s and t) is outputted to the user at 370 as the shortest path.

The customizable route planning technique may be improved using a variety of techniques, such as multiple overlay levels, turn tables (e.g., using matrices), stalling, and path unpacking.

Multiple overlay levels may be used to achieve further speedup. In other words, to accelerate queries, multiple levels of overlay graphs may be used. Instead of using a single parameter U as input, one may use a sequence of parameters $U_1, \ldots, U_k$ of increasing value. Each level is an overlay of the level below. Nested partitions of G are obtained, in which every boundary edge at level i is also a boundary edge at level i−1, for i>1. The level-0 partition is the original graph, with each vertex as a cell. For the i-th level partition, create a graph $H_i$ that includes all boundary arcs, plus an overlay linking the boundary vertices within a cell. The well known PUNCH technique, for example, may be used to create multilevel partitions, in top-down fashion. With multiple levels, an s-t query runs bidirectional Dijkstra on a restricted graph $G_{st}$. An arc (v,w) from $H_i$ will be in $G_{st}$ if both v and w are in the same cell as s or t at level i+1. The weights of the clique edges in $H_i$ can be computed during the metric customization phase using only $H_{i-1}$.

Customization times are typically dominated by building the overlay of the lowest level, since it works on the underlying graph directly (higher levels work on the much smaller cliques of the level below). In this case, smaller cells tend to lead to faster preprocessing. Therefore, as an optimization, an implementation may use one or more phantom levels with very small cells (e.g., with U=32 and/or U=256) to accelerate customization. The phantom levels are only used during customization and are not used during the query stage. Thus, the phantom levels are disregarded for queries, thereby keeping space usage unaffected. In this manner, less space is used and metric customization times are small.

In an implementation, the weights of the clique edges corresponding to each cell of the partition may be represented as a matrix containing the distances among the cell's entry and exit vertices (these are the vertices with at least one incoming or outgoing boundary arc, respectively; most boundary vertices are both). These distances can be represented as 32-bit integers, for example. To relate each entry in the matrix to the corresponding clique edge, one may use arrays to associate rows (and columns) with the corresponding vertex IDs. These arrays are small and can be shared by the metrics, since their meaning is metric-independent. Compared to a standard graph representation, matrices use less space and can be accessed more cache-efficiently.

Thus far, only a standard representation of road networks has been considered, with each intersection corresponding to a single vertex. This does not account for turn costs or restrictions. Any technique can handle turns by working on an expanded graph. A conventional representation is arc-based: each vertex represents one exit point of an intersection, and each arc is a road segment followed by a turn. This representation is wasteful in terms of space usage, however.

Instead, a compact representation may be used in which each intersection on the map is represented as a single vertex with some associated information. If a vertex u has p incoming arcs and q outgoing arcs, associate a p×q turn table $T_u$ to it, where $T_u[i,j]$ represents the turn from the i-th incoming arc into the j-th outgoing arc. In an example customizable setting, each entry represents a turn type (such as "left turn with stop sign"), since the turn type's cost may vary with different metrics. In addition, store with each arc (v,w) its tail order (its position among v's outgoing arcs) and its head order (its position among w's incoming arcs). These orders may be arbitrary. Since vertex degrees are small on road networks, four bits for each may suffice.

Turn tables are determined for each intersection on the map. It is often the case that many intersections share the exact same table. Each unique table is an intersection type. To save space, each type of intersection (turn table) may be stored in a memory or storage device only once and is assigned a unique identifier. Instead of storing the full table, each node stores just the identifier of its intersection type. This is a small space overhead. On typical continental road networks, the total number of such intersection types is modest—in the thousands rather than millions. For example, many vertices in the United States represent intersections with four-way stop signs.

Dijkstra's algorithm, however, becomes more complicated with the compact representation of turns. In particular, it may now visit each vertex (intersection) multiple times, once for each entry point. It essentially simulates an execution on the arc-based expanded representation, which increases its running time by a factor of roughly four. The slowdown can be reduced to a factor of about two with a stalling technique. When scanning one entry point of an intersection, one may set bounds for its other entry points, which are not scanned unless their own distance labels are smaller than the bounds. These bounds depend only on the turn table associated with the intersection, and can be computed during customization.

To support the compact representation of turns, turn-aware Dijkstra is used on the lowest level (but not on higher ones), both for metric customization and queries. Matrices in each cell represent paths between incoming and outgoing boundary arcs (and not boundary vertices, as in the representation without turns). The difference is subtle. With turns, the distance from a boundary vertex v to an exit point depends on whether the cell is entered from an arc (u,v) or an arc (w,v), so each arc has its own entry in the matrix. Since most boundary vertices have only one incoming (and outgoing) boundary arc, the matrices are only slightly larger.

As described so far, queries may find a path from the source s to the destination t in the overlay graph. In an implementation, following the parent pointers of the meeting vertex of forward and backward searches, a path is obtained with the same length as the shortest s-t path in the original graph G, but it may contain shortcuts. If the full list of edges in the corresponding path in G is to be obtained, one may perform a path unpacking routine.

Path unpacking consists of repeatedly converting each level-i shortcut into the corresponding arcs (or shortcuts) at level i−1. To unpack a level-i shortcut (v,w) within cell C, run bidirectional Dijkstra on level i−1 restricted to C to find the shortest v-w path using only shortcuts at level i−1. The procedure is repeated until no shortcuts remain in the path (i.e., until all edges are at level 0).

Running bidirectional Dijkstra within individual cells is usually fast enough for path unpacking. Using four processing cores as an example, unpacking less than doubles query times, with no additional customization space. For even faster unpacking, one can compute additional information to limit the search spaces further. One can store a bit with each arc at level i indicating whether it appears in a shortcut at level i+1. In other words, during customization, mark the arcs with a single bit to show that it is part of a shortcut.

Thus, during queries involving unpacking, one only has to look at arcs that have the bit set.

As described so far, customizable route planning is a fast technique for computing point-to-point shortest paths in road networks. It includes three phases: preprocessing, customization, and queries. The preprocessing phase partitions a graph into multiple levels of loosely connected components (or cells) of bounded size and creates an overlay graph for each level by replacing each component with a clique connecting its boundary vertices. Clique edge lengths are computed during the customization phase. The query phase comprises a bidirectional Dijkstra's algorithm operating on the union of the overlay graphs and the components of the original graph containing the origin and the destination. This search graph is much smaller than the input graph, leading to fast queries.

The customization may be made even faster (e.g., by speeding up its operation of computing the lengths of the shortcuts within each cell), enabling a wide range of applications including highly dynamic applications and on-line personalized cost functions. In an implementation, to compute overlay arc costs, Dijkstra's algorithm may be supplemented or replaced by other techniques, such as contraction and the Bellman-Ford algorithm. Although these other approaches may increase the number of operations (such as arc scans) performed, better locality may be obtained, and parallelism may be enabled at instruction and core levels. The various techniques described herein may be used alone or in conjunction with each other, as well as implemented using the GPU as described further herein.

In an implementation, contraction may be used to accelerate the customization phase, by iteratively removing vertices from the graph while adding additional edges to preserve the distances among the others. To process a cell, contract its internal vertices while preserving its boundary vertices. Thus, instead of computing shortest paths explicitly, eliminate internal vertices from a cell one by one, adding new arcs as needed to preserve distances; the arcs that eventually remain are the desired shortcuts (between the entry and exit points of the cell). For efficiency, not only is the order precomputed in which vertices are contracted, but also the graph itself is abstracted away. In an implementation, during customization, the actual contraction may be simulated by following a (precomputed) series of instructions describing the basic operations (memory reads and writes) the contraction routine would perform.

Figure 4:
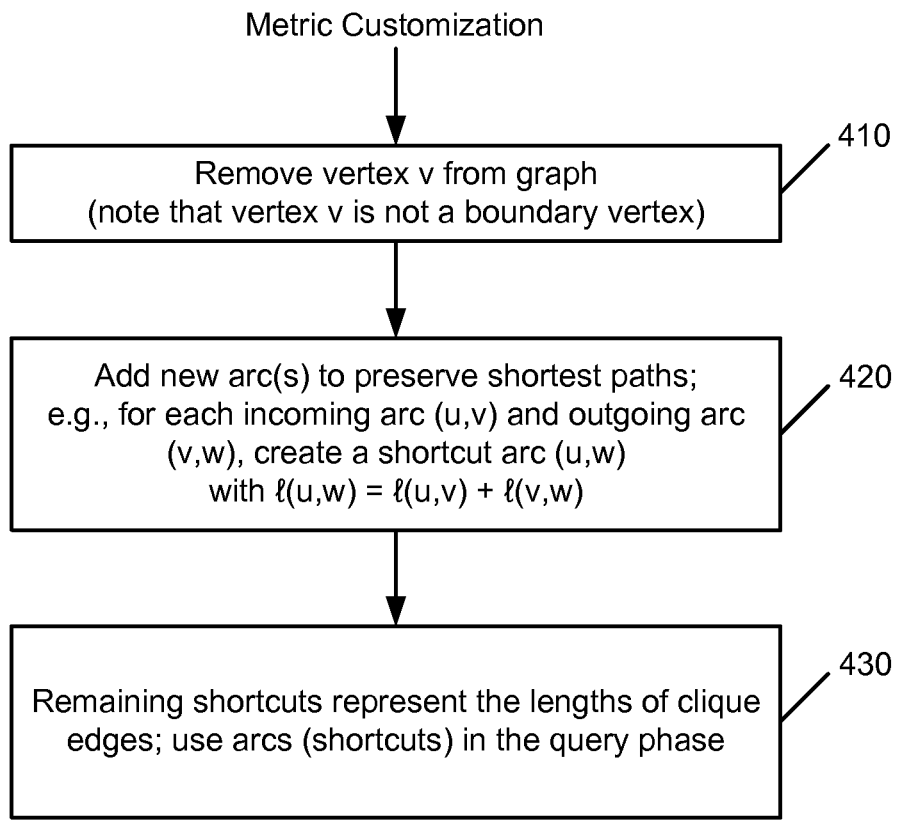
FIG. 4 is an operational flow of an implementation of a contraction method for use with a metric customization technique.

FIG. 4 is an operational flow of an implementation of a contraction method 400 for use with a metric customization technique. The contraction approach is based on the shortcut operation and is used during customization. During a customization phase (e.g., the stage at 220 described above with respect to FIG. 2, or the stage at 340 described above with respect to FIG. 3), to shortcut a vertex v, at 410, the vertex v is removed from the graph, and new arcs are added to preserve shortest paths at 420. It is noted that vertex v is not a boundary vertex (as boundary vertices are not contracted during customization). At 420 for example, for each incoming arc (u,v) and outgoing arc (v,w), create a shortcut arc (u,w) with $l(u,w)=l(u,v)+l(v,w)$. The shortcut may be temporarily added to the partitioned graph to represent a path between u and w. In many applications, a shortcut is only added if it represents the only shortest path between its endpoints in the remaining graph (without v), which can be tested by running a witness search (i.e., a local Dijkstra search) between its endpoints. The remaining shortcuts represent the lengths of clique edges. The arcs (shortcuts) in the final graph at 430 may then be used in the query phase.

The performance of contraction strongly depends on the cost function. With travel times in free-flow traffic (a common case), it works very well. Even for continental instances, sparsity is preserved during the contraction process, and the number of arcs less than doubles. Other metrics often need more shortcuts, which leads to denser graphs and makes finding the contraction order much more expensive.

Within the customizable route planning framework, these issues can be addressed by exploiting the separation between metric-independent preprocessing and customization. During preprocessing, a contraction order to be used by all metrics may be determined. In an implementation, the contraction order may minimize the number of operations performed during contraction. To ensure this order works well even in the worst case, assume that every potential shortcut will be added. Accordingly, do not use witness searches during customization. For maximum efficiency, precompute a sequence of microinstructions to describe the entire contraction process in terms of basic operations, as described further herein.

Computing a contraction order that minimizes the number of shortcuts added (or operations performed) is NP-hard. In practice, one may use on-line heuristics that pick the next vertex to contract based on a priority function that depends on local properties of the graph. A typical criterion is the difference between the number of arcs added and removed if a vertex v were contracted.

Figure 5:
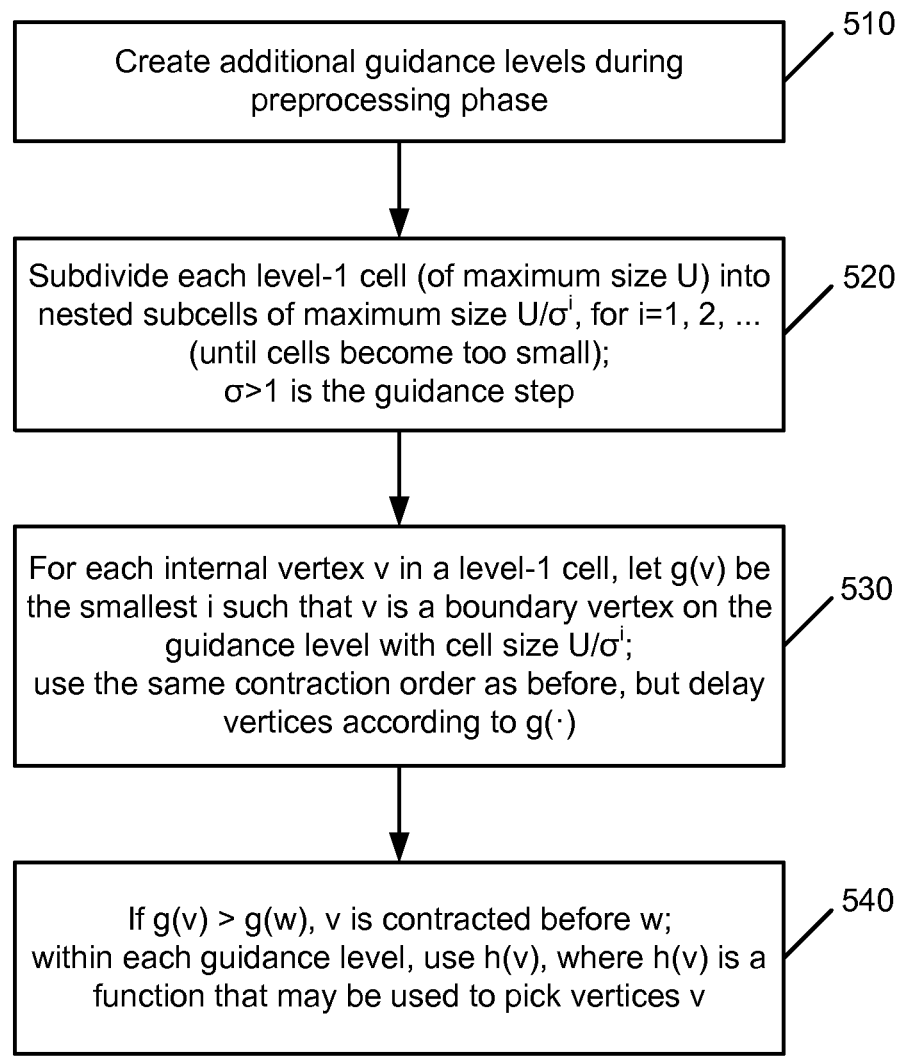
FIG. 5 is an operational flow of an implementation of a contraction order method for use with customizable route planning.

In an implementation, partitions may be used to guide the contraction order. FIG. 5 is an operational flow of an implementation of a contraction order method 500 for use with customizable route planning. At 510, additional guidance levels are created during the preprocessing phase (e.g., the stage at 210 described above with respect to FIG. 2, or the stage at 320 described above with respect to FIG. 3), extending the standard customizable route planning multi-level partition downward (to even smaller cells).

At 520, subdivide each level-1 cell (of maximum size U) into nested subcells of maximum size $U/\sigma^i$, for i=1, 2, ... (until cells become too small). Here $\sigma>1$ is the guidance step.

At 530, for each internal vertex v in a level-1 cell, let g(v) be the smallest i such that v is a boundary vertex on the guidance level with cell size $U/\sigma^i$. Use the same contraction order as before, but delay vertices according to g(·).

At 540, if g(v)>g(w), v is contracted before w; within each guidance level, use h(v), where h(v) is a function that may be used to pick vertices v. For example, in an implementation, vertices v may be selected that minimize h(v), where h(v)=100sc(v)−ia(v)−oa(v), which uses parameters such as the number ia(v) of incoming arcs, the number oa(v) of outgoing arcs, and the number sc(v) of shortcuts created (or updated) if v is contracted. Other functions h(v) may be used depending on the implementation.

While the contraction order is determined during the metric-independent phase of customizable route planning, the contraction can only be executed (by following the order) during customization, once the arc lengths are known. Even with the order given, this execution may be expensive (time consuming, resource-intensive, etc.). To contract v, the costs (and endpoints) of its incident arcs are retrieved, and then each potential shortcut (u,w) is processed by either inserting it or updating its current value. This uses data structures supporting arc insertions and deletions, and, even checking if a shortcut already exists, gets costlier as degrees increase. Each fundamental operation, however, is straightforward: read the costs of two arcs, add them up, compare the result with the cost of a third arc, and update it if needed.

The contraction routine can therefore be fully specified by a sequence of triples (a,b,c) (e.g., an instruction array). Each element in the triple is a memory position holding an arc (or shortcut) length. So read the values in a and b and write the sum to c if there is an improvement.

As described above, contraction may be implemented using a dynamic graph data structure. However, this may be too slow for certain applications. Instead, in an implementation, microcode for contraction may be used in which the preprocessing phase may be used to store the memory positions that are read from and written to explicitly in a list. The customization phase then executes this instruction list. This list can be optimized to improve locality.

Figure 6:
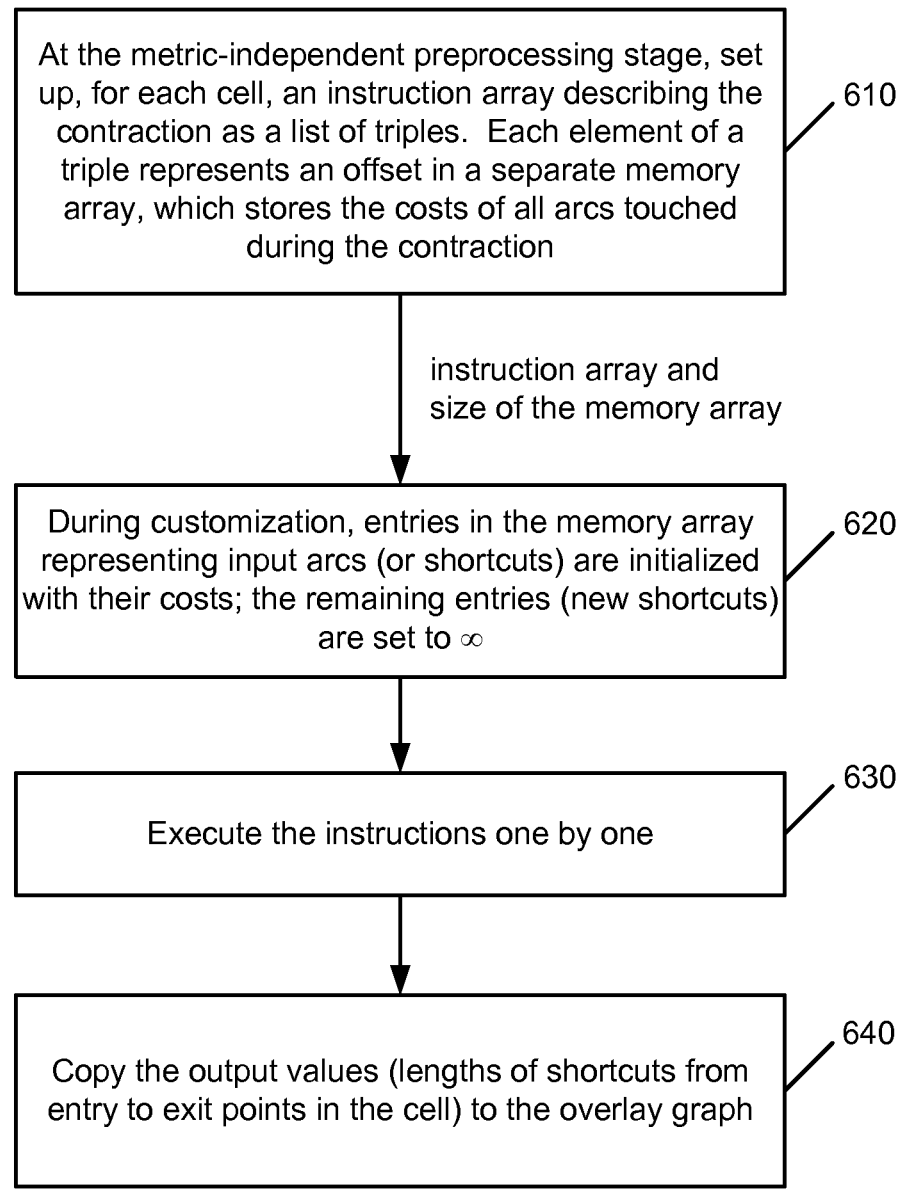
FIG. 6 is an operational flow of an implementation of a microinstruction method for use with customizable route planning.

FIG. 6 is an operational flow of an implementation of a microinstruction method 600 for use with customizable route planning. At 610, because the sequence of operations is the same for any cost function, use the metric-independent preprocessing stage to set up, for each cell, an instruction array describing the contraction as a list of triples. Each element of a triple represents an offset in a separate memory array, which stores the costs of all arcs (temporary or otherwise) touched during the contraction. The preprocessing stage outputs the entire instruction array as well as the size of the memory array.

At 620, during customization, entries in the memory array representing input arcs (or shortcuts) are initialized with their costs; the remaining entries (new shortcuts) are set to ∞. At 630, the instructions are executed one by one, and at 640, output values (lengths of shortcuts from entry to exit points in the cell) are copied to the overlay graph. With this approach, the graph itself is abstracted away during customization. There is no need to keep track of arc endpoints, and there is no notion of vertices at all. The code just manipulates numbers (which happen to represent arc lengths). This is cheaper and less complex than operating on an actual graph.

Although the space used by the instruction array is metric-independent (shared by all cost functions), it can be quite large. It may be kept manageable by representing each triple with as few bits as necessary to address the memory array. In addition, use a single macroinstruction to represent the contraction of a vertex v whenever the resulting number of writes exceeds an unrolling threshold τ. This instruction explicitly lists the addresses of v's $c_{in}$ incoming and $c_{out}$ outgoing arcs, followed by the corresponding $c_{in} \cdot c_{out}$ write positions. The customization phase loops over the incoming and outgoing positions, which is slower than reading tuples but saves space. It is contemplated that other instruction representations can be used to reduce the contraction cost.

Contraction works well on the first overlay level, because it operates directly on the underlying graph, which is sparse. Density quickly increases during contraction, however, making it expensive as cell sizes increase. On higher levels, shortest paths may be computed explicitly (as before), but each computation can be made more efficient by replacing the Dijkstra algorithm with lightweight algorithms that work better on small graphs, and applying techniques to reduce the size of the search graph.

In other words, although contraction could be used to process the entire hierarchy, it is not as effective at higher levels as it is at level-1 cells, because the graphs within each higher-level cell are much denser. In such cases, it is cheaper to run graph searches. In some implementations, search-based techniques may be used to accelerate higher levels of the hierarchy.

In an implementation, the search graph may be pruned. To process a cell C, compute the distances between its entry and exit points. For example, the graph GC being operated on within the cell C is the union of subcell overlays (complete bipartite graphs) with some boundary arcs between them. Instead of searching GC directly, first contract its internal exit points. Because each such vertex has out-degree one (its outgoing arc is a boundary arc within C), this reduces the number of vertices and edges in the search graph. Note that C's own exit points are preserved (they are the targets of the searches), but they do not need to be scanned (they have no outgoing arcs).

In an implementation, locality may be improved. Conceptually, to process a cell C, the full overlay graph may be operated on, but restricting the searches to vertices inside C. For efficiency, copy the relevant subgraph to a separate memory location, run the searches on it, then copy the results back. This simplifies the searches (there are no special cases), allows the use of sequential local IDs, and improves locality.

Contraction is a good approach for the lowest levels of the hierarchy. However, on the topmost levels, graph algorithms may be preferable. For example, the well-known Bellman-Ford algorithm may be used (instead of the Dijkstra algorithm) to compute the edge lengths of the clique edges. The Bellman-Ford algorithm can be further accelerated using instruction-level parallelism (e.g., SSE (streaming SIMD extensions) or AVX (Advanced Vector Extensions) instructions). Locality can be improved by operating on partially contracted subgraphs representing small cells.

Thus, customization may be further accelerated by replacing Dijkstra's algorithm in the metric customization stage (e.g., 220 of FIG. 2, or 340 of FIG. 3) with the well-known Bellman-Ford algorithm. The Bellman-Ford algorithm starts by setting the distance label of the source to 0, and all others to ∞. Each round then scans each vertex once, updating the distance label of its neighbors appropriately. For better performance, only scan vertices that are active (i.e., whose distance improved since the previous scan), and stop when there is no active vertex left.

While the Bellman-Ford algorithm cannot scan fewer vertices than Dijkstra, its simplicity and better locality make it competitive. The number of rounds is bounded by the maximum number of arcs on any shortest path, which is small for reasonable metrics but linear in the worst case. Therefore, in an implementation, switch to Dijkstra's algorithm whenever the number of Bellman-Ford rounds reaches a given (constant) threshold.

It is contemplated that other techniques may be used besides Bellman-Ford, such as the well-known Floyd-Warshall algorithm. The Floyd-Warshall algorithm computes shortest paths among all vertices in the graph, and for use herein, only extract the relevant distances. Its running time is cubic, but with its tight inner loop and good locality, it could be competitive with the Bellman-Ford algorithm on denser graphs.

In an implementation, multiple-source executions may be used. Multiple runs of Dijkstra's algorithm (from different sources) can be accelerated if combined into a single execution. This approach may be applied to the Bellman-Ford algorithm. Let k be the number of simultaneous executions, from sources $s_1, \ldots, s_k$. For each vertex v, keep k distance labels: $d_1(v), \ldots, d_k(v)$. The $d_i(s_i)$ values are initialized to zero (each $s_i$ is the source of its own search), and the remaining $d_i(\cdot)$ values are set to ∞. The k sources $s_i$ are initially marked as active. When the Bellman-Ford algorithm scans an arc (v,w), try to update all k distance labels of w at once: for each i, set $d_i(w) \leftarrow \min\{d_i(w), d_i(v)+l(v,w)\}$. If any such distance label actually improves, mark w as active. This simultaneous execution uses as many rounds as the worst of the k sources, but, by storing the k distances associated with a vertex contiguously in memory, locality is much better. In addition, it enables instruction-level parallelism, described further below.

Modern CPUs have extended instruction sets with SIMD (single instruction, multiple data) operations, which work on several pieces of data at once. In particular, the SSE instructions available in x86 CPUs can manipulate special 128-bit registers, allowing basic operations (such as additions and comparisons) on four 32-bit words in parallel.

Consider the simultaneous execution of the Bellman-Ford algorithm from k=4 sources, as above. When scanning v, first store v's four distance labels in one SSE register. To process an arc (v,w), store four copies of l(v,w) into another register and use a single SSE instruction to add both registers. With an SSE comparison, check if these tentative distances are smaller than the current distance labels for w (themselves loaded into an SSE register). If so, take the minimum of both registers (in a single instruction) and mark w as active.

In addition to using SIMD instructions, core-level parallelism may be used by assigning cells to distinct cores. This may also be done for level-1 cells with microinstructions. In addition, parallelize the top overlay level (where there are few cells per core) by further splitting the sources in each cell into sets of similar size, and allocating them to separate cores (each accessing the entire cell).

In an implementation, more levels may be used during the customization stage and then some of those levels may be discarded. These additional levels, referred to as mezzanine levels, may be used to accelerate customization. These are intermediate partition levels that are used during customization (for speed), but not during queries (to save space). They are similar to the phantom levels described above, which are small (temporary) levels used to accelerate the customization of the lowest actual level in a hierarchy.

As described above, the customization phase computes arc lengths of bipartite graphs. It has been determined that the fastest approach based on graph traversal is based on the classical Bellman-Ford algorithm. To process a cell C at level i, it first builds a compact graph $G_C=(V_C, A_C)$ comprising the shortcuts and boundary arcs on level i-1 that are in C, but with the head vertices of the internal boundary arcs (i.e., those not on level i) removed and their incident arcs concatenated. Let $N_C$ and $X_C$ be the sets of entry and exit vertices of C, respectively. The algorithm maintains, for each vertex in $V_C$, a distance array with $|N_C|$ values; the k-th position for the k-th entry vertex is initialized with zero, and all others with infinity. Then the Bellman-Ford algorithm is run as long as there is an improvement on any of the distance labels. Eventually, the distance labels of the exit vertices will reflect their distances from the entry vertices. This approach may be implemented using a GPU, as follows.

In a GPU-based implementation, the vertices in $V_C$ can be classified into three categories: entry ($N_C$), exit ($X_C$), and inner ($I_C$). In an implementation, entry vertices have only outgoing arcs, and exit vertices have only incoming arcs. Moreover, there are four types of arc in $A_C$: the init arcs $A_C^j$ link entry to inner vertices, the inner arcs $A_C^i$ connect inner vertices to one another, the collection arcs $A_C^c$ link inner to exit vertices, and the mapping arcs $A_C^m$ link entry to exit vertices. Note that init and mapping arcs are shortcuts, while each inner or collection arc is the concatenation of a shortcut and a cut arc (all from level i-1). When running on $G_C$, the Bellman-Ford technique touches each mapping and init arc only once, at which point it sets exactly one distance value at its head vertex.

For a cell C, let $G_C^i=(I_C, A_C^i)$ be its inner graph and $V_C^c=(X_C, A_C^c)$ be its collection graph. In general, on level I, compute the costs of shortcuts on level i (to be stored in a shortcut array $S_i$) from costs of level i-1 shortcuts and boundary arcs (stored in a boundary array B). An example technique processes a cell in five phases, as described with respect to FIG. 7.

Figure 7:
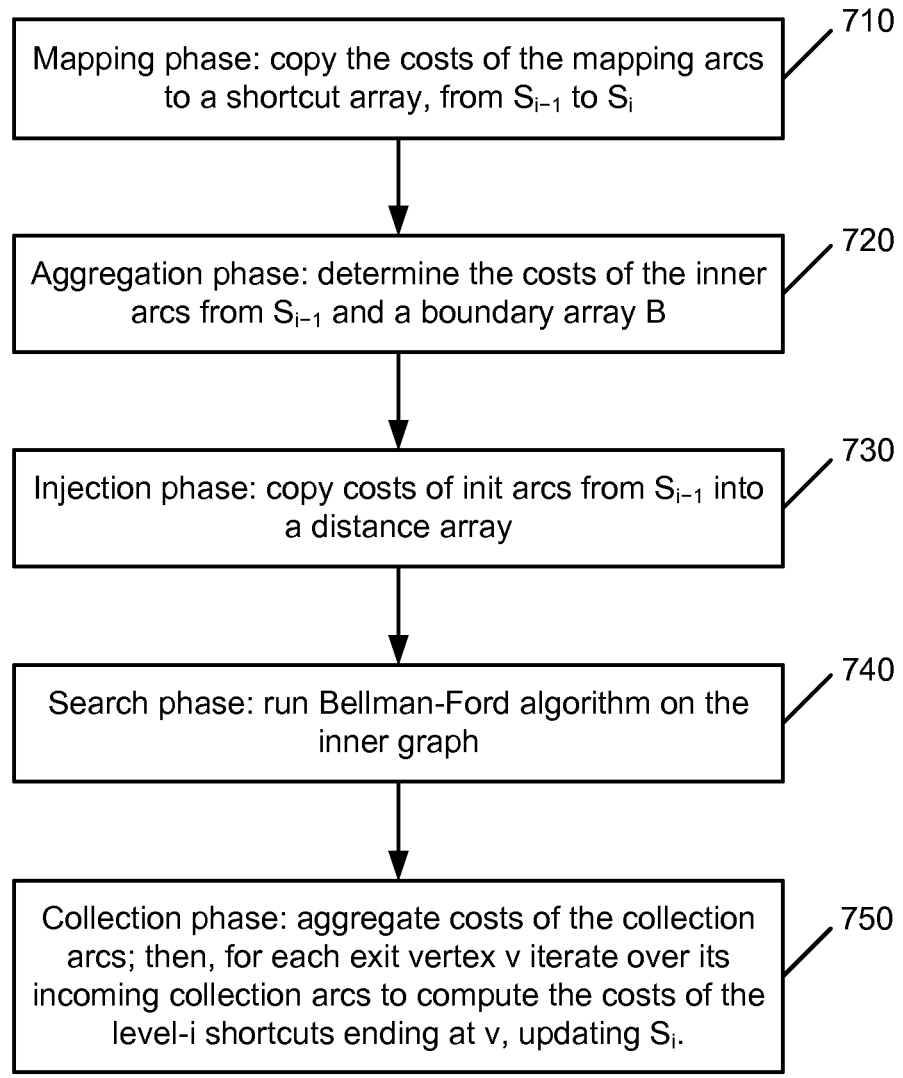
FIG. 7 is an operational flow of an implementation of a search-based metric customization method for use with customizable route planning.

FIG. 7 is an operational flow of an implementation of a search-based metric customization method 700. At 710, a mapping phase copies the costs of the mapping arcs from $S_{i-1}$ to $S_i$. At 720, an aggregation phase computes the costs of the inner arcs from $S_{i-1}$ and a boundary array B (i.e., an array with the weights of the cut arcs). At 730, in an injection phase, init arcs copy their costs from $S_{i-1}$ into the distance array (which now has size $|N_C|\cdot|I_C|$). At 740, a search phase runs a Bellman-Ford algorithm on the inner graph, stopping when there is no improvement. At 750, a collection phase first aggregates the costs of the collection arcs (as in the aggregation phase); then, for each exit vertex v, it iterates over its incoming collection arcs to compute the costs of the level-i shortcuts ending at v, updating $S_I$.

A global implementation involving a GPU is now described. The global implementation is orchestrated by the CPU and invokes multiple kernels per level i. One global distance array may be maintained, representing the distance values of all inner vertices of all cells on level i.

Figure 8:
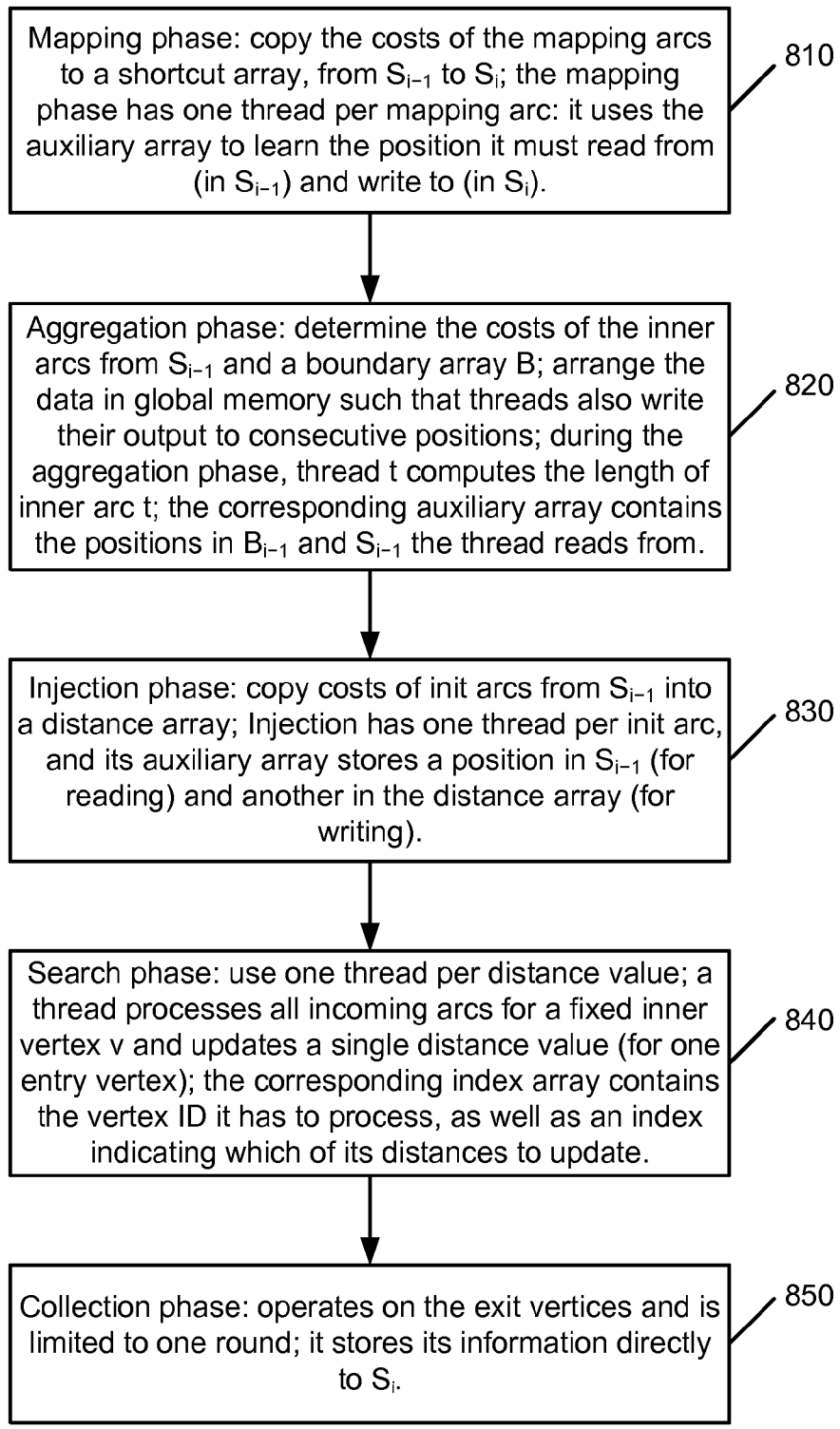
FIG. 8 is an operational flow of a implementation of a search-based metric customization method using a GPU for use with customizable route planning.

FIG. 8 is an operational flow of a implementation of a search-based metric customization method 800 using a GPU. For each of the first three phases of customization (mapping, aggregation, and injection), a single kernel is created with one thread for each relevant arc. These threads are supported by maintaining auxiliary arrays with the relevant information in global memory; thread t reads position t from this array.

At 810, a mapping phase copies the costs of the mapping arcs from $S_{i-1}$ to $S_i$. More precisely, the mapping phase has one thread per mapping arc: it uses the auxiliary array to learn the position it must read from (in $S_{i-1}$) and write to (in $S_I$).

At 820, an aggregation phase computes the costs of the inner arcs from $S_{i-1}$ and B. For aggregation, arrange the data in global memory such that threads also write their output to consecutive positions. During the aggregation phase, thread t computes the length of inner arc t; the corresponding auxiliary array contains the positions in $B_{i-1}$ and $S_{i-1}$ the thread must read from.

At 830, in an injection phase, init arcs copy their costs from $S_{i-1}$ into the distance array. Injection has one thread per init arc, and its auxiliary array stores a position in $S_{i-1}$ (for reading) and another in the distance array (for writing).

At 840, a search phase is performed. The search phase uses one thread per distance value. Recall that there is one distance per pair (inner vertex, entry vertex). A thread processes all incoming arcs for a fixed inner vertex v and updates a single distance value (for one entry vertex). The corresponding index array contains the vertex ID it has to process, as well as an index (a number from 0 to $|N_C|-1$) indicating which of its distances to update. This information can be packed into 32 bits. Also, rather than storing the head ID, an arc stores the position of its first distance; the thread then uses the index as an offset. Because global synchronization is used, each Bellman-Ford iteration runs as a single kernel. Each thread writes to a timestamp array (indexed by cell number) whenever it updates some value; the Bellman-Ford algorithm stops after an iteration in which this array does not change.

At 850, a collection phase is performed. The collection phase is similar to the search phase, but operates on the exit vertices and is limited to one round. Moreover, it stores its information directly to $S_i$. To make these accesses more efficient, shortcuts may be ordered by tail in global memory.

Note that this implementation has no write-write conflict. During the running of the Bellman-Ford algorithm, a thread may read a position that is being updated by another. Because integers are atomic and values only improve from one round to the next, this does not affect correctness.

A local implementation involving a GPU is now described. The local implementation invokes one kernel per level and operates block-wise. An implementation of an algorithm is first described assuming it processes one cell per block, then it is generalized.

Because there is no longer one thread for each value dealt with, use a small block header to store relevant information the threads use. It includes the numbers of the types of arcs (mapping, injection, inner, and collection) and vertices (inner, entry, and exit); in addition, the block header has pointers to the positions in global memory where the topology of the inner and collection graphs are stored.

Figure 9:
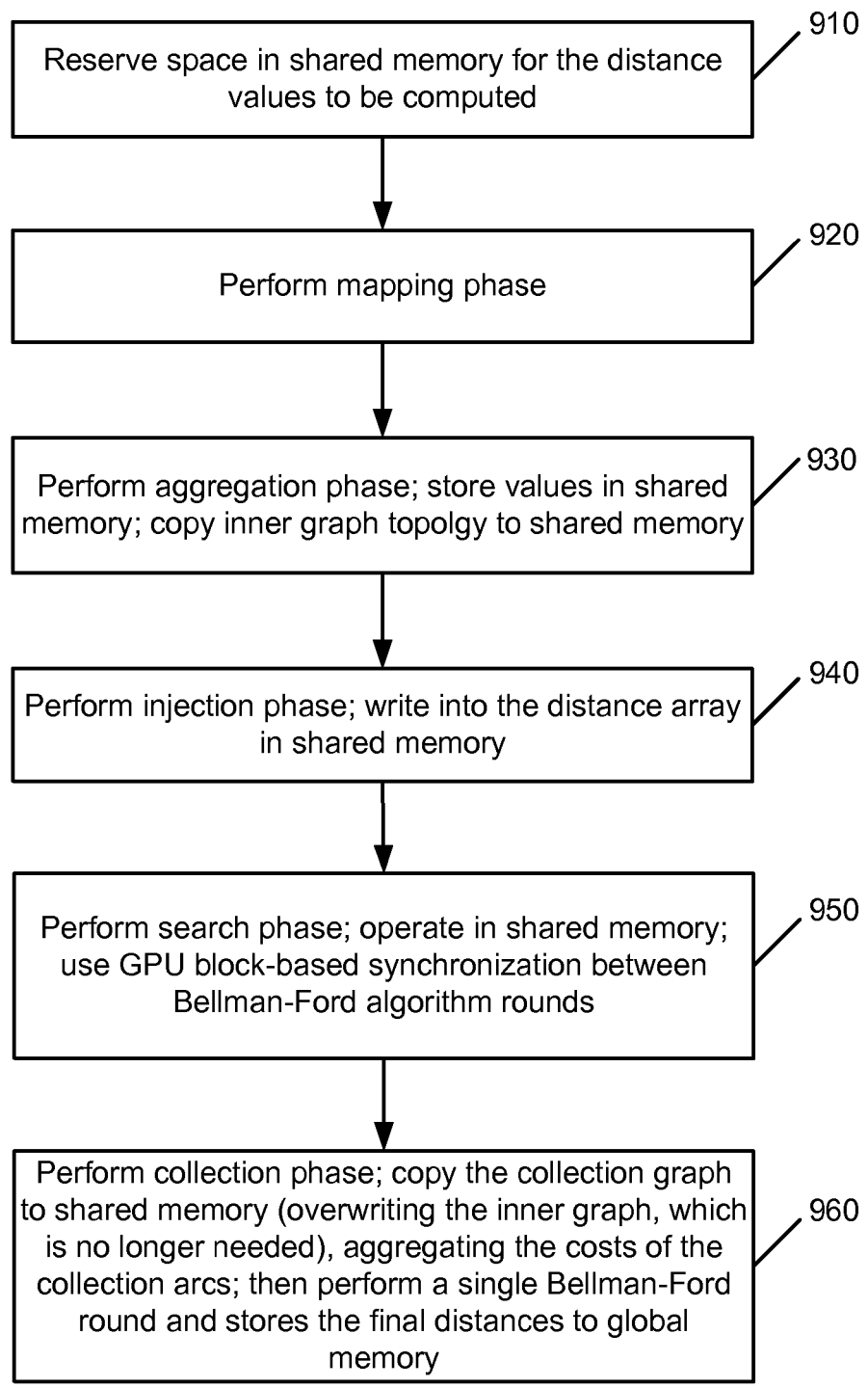
FIG. 9 is an operational flow of another implementation of a search-based metric customization method using a GPU for use with customizable route planning.

FIG. 9 is an operational flow of another implementation of a search-based metric customization method 900 using a GPU. At 910, space is reserved in shared memory for the distance values to be computed. The space is initialized with ∞.

At 920, a mapping phase is performed as in 810. At 930, an aggregation phase is performed similar to 820, but the values are stored in shared memory; it also copies the inner graph topology to shared memory.

At 940, injection is performed similarly at 830, but writes into the distance array in shared memory. At 950, the search phase is performed, and operates entirely in shared memory and uses the GPU block-based synchronization between Bellman-Ford algorithm rounds. Note that thread t (within the block) can deduct from the block header both the vertex it has to work on ($\lfloor t/|I_C| \rfloor$) and the entry vertex number (t mod $|I_C|$).

At 960, the collection phase first copies the collection graph to shared memory (overwriting the inner graph, which is no longer needed), aggregating the costs of the collection arcs. It then performs a single Bellman-Ford round and stores the final distances to global memory. This global memory may be used as fallback if any of these phases does not fit in shared memory. In an implementation, 16 bits may be used for indexing; if that is not enough for a given cell, the entire level may be processed using the global implementation instead. It has been determined that this happens rarely.

Because it is known in advance how much shared memory each cell occupies, multiple cells may be grouped into the same block. The cells can be reordered in GPU memory to ensure their shortcuts appear consecutively. For regularity, group cells that have the same number of entry vertices. The algorithm works as before: it just sees the input as a bigger, disconnected graph.

The above assumes that a level i−1 overlay may be used to compute the overlay of level i, but this is not possible for the first level, when operating on the underlying original graph. This may be accommodated for by adapting the routine that aggregates arc costs. Mapping and init arcs represent an original graph arc, and all other arcs are a concatenation of a turn and an original arc. Therefore, for a mapping or init arc, store its physical properties (rather than a position in $S_{i-1}$); for other arcs, store the turn type as well. The current metric information is evaluated during aggregation.

In an implementation, mezzanine levels may be used as an optimization. As noted above, mezzanine levels are partition levels that are used to accelerate customization, but discarded for queries (to save space). Mezzanine levels help reduce the size of inner graphs (which are expensive to deal with) by turning more arcs into init, mapping, or collection arcs (which are accessed a constant number of times). This reduces the number of Bellman-Ford iterations. There is some overhead for mapping the extra levels, but this is very cheap on the GPU. Moreover, they increase both the number of cells and the space consumption on the GPU. Note, however, that shortcut weights can be overwritten for mezzanine level i as soon as level i+1 is processed.

Another implementation is directed to contraction-based customization. For lower levels of the hierarchy, customization is faster if one uses graph contraction instead of graph searches (e.g., Dijkstra or Bellman-Ford algorithms). It is first described how the CPU-based approach works on the CPU, and then how it is adapted to the GPU.

As described in further detail above, when processing a cell C on the CPU, compute the lengths of the shortest paths (in Gc) from its entry points to its exit points using the shortcut operation. Shortcutting an inner vertex v means removing it from the graph and, for each incoming arc (u,v) and outgoing arc (v,w), creating a shortcut arc (u,w) with length l(u,w)=l(u,v)+l(v,w). If (u,w) does not yet exist, insert it; if it does, update its length if the new arc is shorter. By repeatedly applying this operation to all inner vertices in $G_C$, one ends up with a bipartite graph with arcs between entry and exit points of C, where arc lengths represent the corresponding distances (missing arcs represent infinite distances). Any contraction order leads to the same final topology, but a carefully chosen (during preprocessing) order based on nested dissections leads to fewer operations overall and a faster algorithm.

The fundamental operation of contraction is to read the costs of two arcs, add them up, compare the result with the cost of a third arc, and update its cost if needed. Instead of using a graph during customization, it has been proposed to simulate the contraction process during preprocessing to create an instruction array representing these fundamental operations (microinstructions) compactly as triples (a, b, c), where a and b are the positions to be read and c the position to write to. These positions refer to a memory array M and correspond to arc costs. Each cell C has its own instruction and memory arrays. Moreover, they use an arc instruction array to initialize M.

Figure 10:
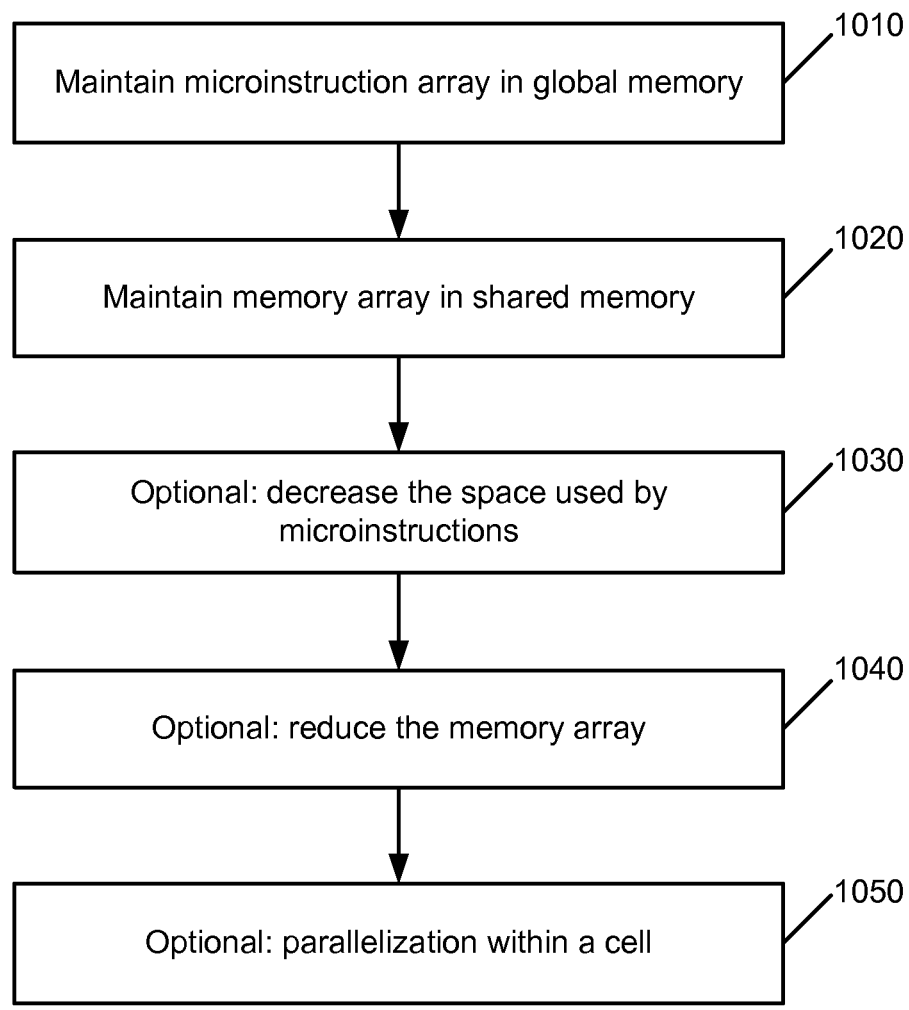
FIG. 10 is an operational flow of an implementation of a metric customization method using microinstructions and a GPU for use with customizable route planning.

FIG. 10 is an operational flow of an implementation of a metric customization method 1000 using microinstructions and a GPU. Although the microinstruction array can be fairly large, it is only read once (and sequentially), so it may be maintained in global memory at 1010. Because M is much smaller and has a less rigid access pattern (each position can be accessed multiple times), it may be maintained in shared memory at 1020. Several issues may be addressed depending on the implementations: decreasing the space used by microinstructions (for fewer accesses to slower memory) at 1030, reducing the memory array (to keep multiple cells in shared memory at once) at 1040, and parallelization within a cell (for efficiency on GPU) at 1050, as described further below. These may be attained by preprocessing and enriching the microinstructions before copying them to the GPU (the arc instructions can be copied essentially as is).

First, the microinstructions may be made more compact. In an implementation, because each entry in the memory array M takes 32 bits of shared memory, it can have at most 12,288 positions. These can be addressed with 14 bits, or 42 bits per triple in the instruction array. For most cells, however, 32 bits are enough. To achieve this, first ensure that a<b in each instruction triple (a, b, c) (swap a and b otherwise), then store the triple (a, b−a, c−b) using 14, 8, and 9 bits, respectively (reserve the 32nd bit for later). This means a can be any position in shared memory, b can refer to positions a+1 to a+256, and c can refer to b−256 to b+255. If a cell has at least one instruction that cannot use this compact representation (with b too far from a or c too far from b), use a full 48-bit representation for all of its microinstructions. Although particular values are described above for various parameters, this is not intended to be limiting; It is contemplated that different parameters can be used depending on the implementation, and/or properties of the system in which the these features and parameters are implemented.

To parallelize within a cell, group independent instructions by layers. Note that two instructions in a cell are independent if they do not write to the same memory position. Create these layers by working in rounds, from latest to earliest, greedily assigning instructions to the latest possible layer (after accounting for the dependencies between them); then apply a postprocessing step to make the layers more balanced.

Next, reduce the memory array. Once a shortcut is eliminated by the contraction routine, the memory position that stores its cost could be reused for another shortcut, thus saving on shared memory. Identify such reusage opportunities during preprocessing as follows. Process the layered microinstructions from earliest to latest. Interpret each entry in a triple (a, b, c) as a shortcut (rather than positions in M, which is what is sought to be determined). Maintain counters of pending reads and writes for each shortcut and a candidate pool of free memory positions (initially, all but those used by the arc instructions); when a read counter becomes zero for some shortcut, add its position to the pool for potential reuse in future layers. When processing an instruction (a, b, c) that writes to shortcut c for the first time, assign c to the free position that is closest to b; in addition, use the 32nd bit (mentioned above) to mark this instruction, indicating that the GPU writes to the target position (ignoring the value already there) when executing this instruction. As an optimization, if an instruction (a, b, c) performs the last read from a (or b) and the first to c, assign c to a's (or b's) position. If after running this algorithm, the new instructions still cannot be represented in compact form (32 bits), perturb the positions of the original arcs and retry; this is cheap and helps in some cases. Because the final shortcuts do not necessarily have consecutive positions in M, use a map to translate them to the corresponding (consecutive) positions in $S_1$, the shortcut array on level 1. Note that microinstructions are used only to compute the shortcuts on the lowest level.

In an implementation, for better block utilization, greedily pack cells as long as their combined memory arrays fit in shared memory. For better memory access patterns, do not mix compact and full cells. It is preferable to group cells with the same number of layers within a block, but blocks with different depth may be combined if needed. When the instruction array is stored on the GPU, it may be reordered to reflect the block assignments: instructions within the same block are sorted by layer (across cells). Because the GPU synchronizes between layers, layer sizes are stored in the block header.

Figure 11:
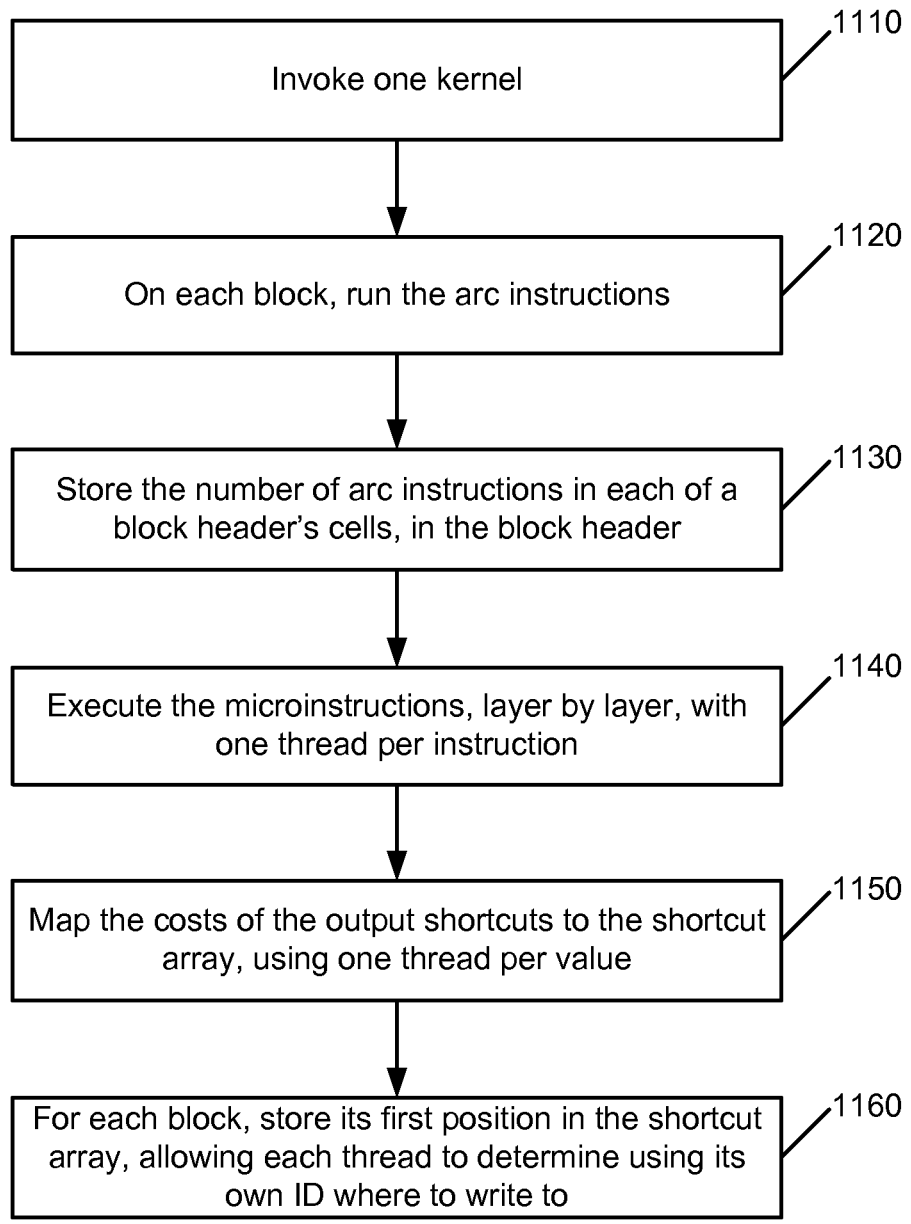
FIG. 11 an operational flow of another implementation of a metric customization method using a GPU for use with customizable route planning.

FIG. 11 an operational flow of another implementation of a metric customization method 1100 using a GPU. Regarding GPU execution, with the data structures set up, compute $S_1$ on the GPU as follows. At 1110, invoke one kernel for the full computation, because synchronization is only needed within a block. At 1120, on each block, first run the arc instructions. The block header stores the number of arc instructions in each of its cells at 1130; each thread can use this information (and its own ID) to determine where in shared memory to store the result of the arc instruction it is responsible for. Then execute the microinstructions at 1140, layer by layer, also with one thread per instruction. At 1150, map the costs of the output shortcuts to $S_1$, using one thread per value. At 1160, for each block, store its first position in $S_1$, allowing each thread to determine (using its own ID) where to write to.

Figure 12:
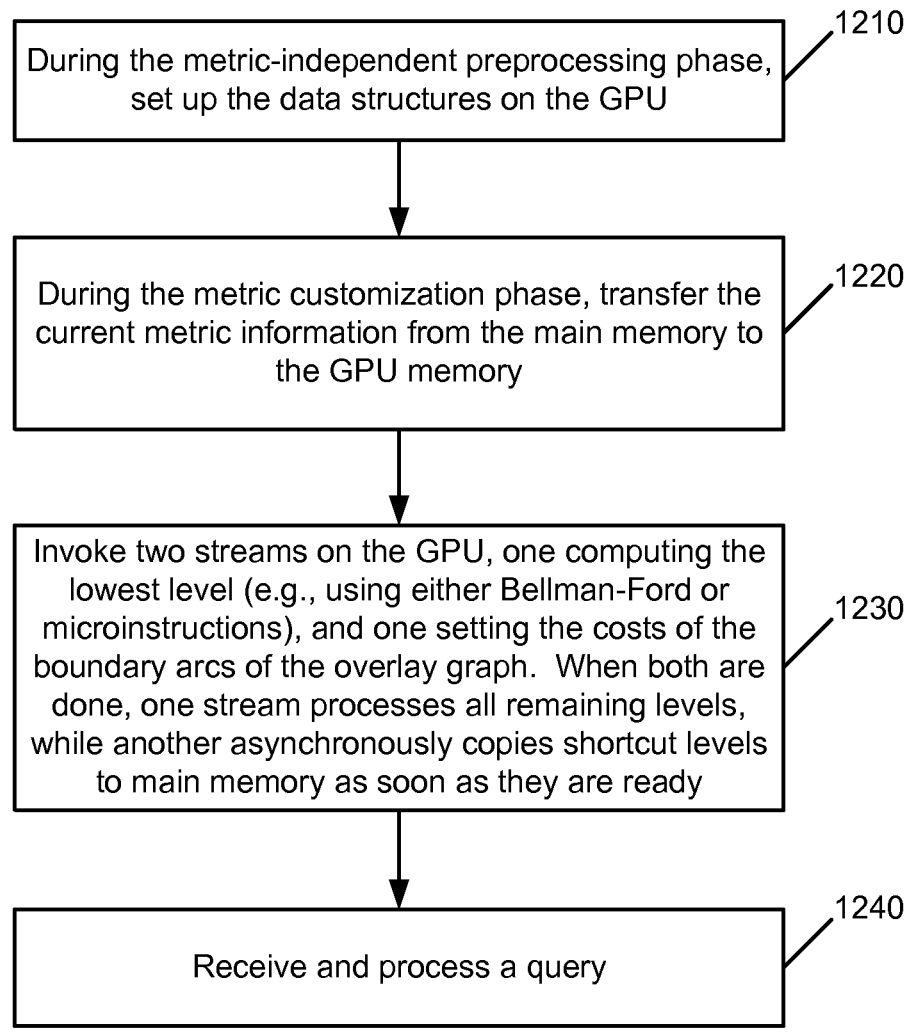
FIG. 12 is an operational flow of an implementation of a method of using a GPU in customizable route planning.

FIG. 12 is an operational flow of an implementation of a method 1200 of using a GPU in customizable route planning. In an implementation, at 1210 during the metric-independent phase of CRP, set up the data structures on the GPU, including arc instructions to aggregate the costs of the boundary arcs. The work flow of the customization phase is as follows. At 1220, start by transferring the current metric information from main memory to the GPU memory.

At 1230, invoke two streams on the GPU, one computing the lowest level (using either Bellman-Ford or microinstructions), and one setting the costs of the boundary arcs of the overlay graph. When both are done, one stream processes all remaining levels, while another asynchronously copies shortcut levels to main memory as soon as they are ready. This hides the time needed for the GPU-CPU data transfer almost completely.

In an implementation, multiple GPUs in a single machine may be used by allocating all top-level cells (and their subcells) among them so as to balance the (estimated) work. This approach uses no GPU-to-GPU communication during customization.

At 1240, a query may be received and processed, using techniques described above (e.g., with respect to FIGS. 2 and 3).

Figure 13:
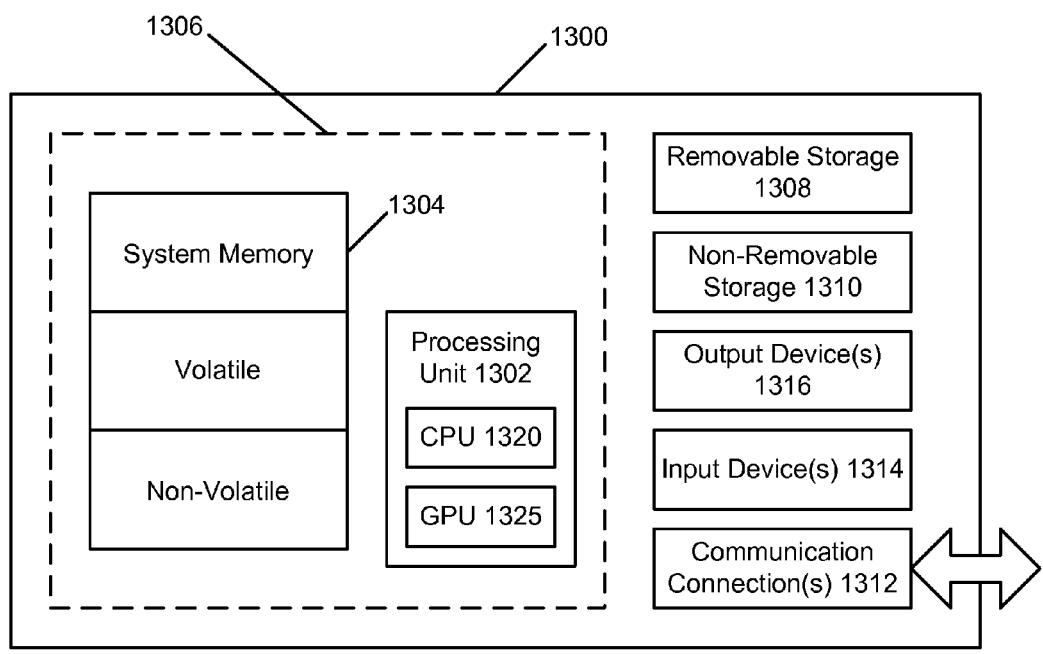
FIG. 13 shows an exemplary computing environment.

FIG. 13 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 13, an exemplary system for implementing aspects described herein includes a computing device, such as computing device 1300. In its most basic configuration, computing device 1300 typically includes at least one processing unit 1302 and memory 1304. In an implementation, the processing unit 1302 may comprise a CPU 1320 and a GPU 1325.

Depending on the exact configuration and type of computing device, memory 1304 may be volatile (such as random access memory (RAM)), non-volatile (such as read-only memory (ROM), flash memory, etc.), or some combination of the two. This most basic configuration is illustrated in FIG. 13 by dashed line 1306.

Computing device 1300 may have additional features/functionality. For example, computing device 1300 may include additional storage (removable and/or non-removable) including, but not limited to, magnetic or optical disks or tape. Such additional storage is illustrated in FIG. 13 by removable storage 1308 and non-removable storage 1310.

Computing device 1300 typically includes a variety of computer readable media. Computer readable media can be any available media that can be accessed by computing device 1300 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 1304, removable storage 1308, and non-removable storage 1310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

Computing device 1300 may contain communications connection(s) 1312 that allow the device to communicate with other devices. Computing device 1300 may also have input device(s) 1314 such as a keyboard, mouse, pen, voice input device, touch input device, etc. Output device(s) 1316 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for determining a shortest path between an origin location and a destination location, comprising:
preprocessing, at a central processing unit (CPU) of a computing device, a graph comprising a plurality of vertices and a plurality of edges to generate preprocessed data comprising a partitioned graph, wherein each edge of the plurality of edges comprises a plurality of properties, and wherein each property of the plurality of properties has a cost;
performing, at a graphics processing unit (GPU) of the computing device, metric customization using the partitioned graph to generate metric customization data for augmenting the partitioned graph with metrics encoding a cost of traversing one or more edges of the partitioned graph, wherein performing metric customization comprises:
copying a plurality of costs of a plurality of mapping arcs to an array;
determining a plurality of costs of a plurality of arcs of the graph from the array;
performing a search phase using the plurality of arcs and the determined plurality of costs of the plurality of arcs; and
computing the metric customization data comprising a plurality of costs of shortcuts using results of the search phase; and
computing, at the CPU, a shortest path between the origin location and the destination location using the preprocessed data and the metric customization data, wherein the method further comprises:
the CPU sending metric information to the GPU for use by the GPU during the metric customization; and
the CPU copying metric customization data from the GPU to memory of the CPU.

2. The method of claim 1, wherein the preprocessing is metric-independent.

3. The method of claim 1, further comprising:
receiving a query at the computing device, the query comprising the origin location and the destination location.

4. The method of claim 1, wherein the array is a shortcut array, and wherein the plurality of arcs are inner arcs and init arcs.

5. The method of claim 1, wherein for determining the plurality of costs of the plurality of arcs a single kernel is created with one thread for each arc.

6. The method of claim 1, wherein performing metric customization comprises search-based metric customization using the GPU.

7. The method of claim 1, wherein performing metric customization comprises contraction-based metric customization using the GPU.

8. The method of claim 1, wherein performing metric customization comprises using microinstructions with the GPU.

9. The method of claim 8, wherein using microinstructions with the GPU comprises storing a microinstruction array in a global memory and storing a memory array in a shared memory.

10. The method of claim 1, wherein the graph represents a network of nodes.

11. The method of claim 1, wherein the graph represents a road map.

12. A method of determining a shortest path between two locations, comprising:
obtaining in a computing device, a graph comprising a plurality of vertices and edges, wherein each edge of the plurality of edges comprises a plurality of properties, and wherein each property of the plurality of properties has a cost;
executing a preprocessing stage in a central processing unit (CPU) of the computing device, the preprocessing stage comprising generating preprocessed data comprising a partitioned graph;
executing a metric customization stage, in a graphics processing unit (GPU) of the computing device, to generate metric customization data for augmenting the partitioned graph with metrics encoding a cost of traversing one or more edges of the partitioned graph, wherein executing the metric customization stage comprises:
copying a plurality of costs of a plurality of mapping arcs to an array;
determining a plurality of costs of a plurality of arcs of the graph from the array;
performing a search phase using the plurality of arcs and the determined plurality of costs of the plurality of arcs; and
computing the metric customization data comprising a plurality of costs of shortcuts using results of the search phase;
computing, at the CPU, a point-to-point shortest path using the preprocessed data and the metric customization data without re-executing the preprocessing stage; and
outputting the point-to-point shortest path, by the computing device, wherein the method further comprises:
the CPU sending metric information to the GPU for use by the GPU during the metric customization; and
the CPU copying the metric customization data from the GPU to memory of the CPU.

13. The method of claim 12, wherein executing the metric customization stage further comprises contraction-based metric customization using the GPU.

14. A system for determining a shortest path between two locations, comprising:
a central processing unit (CPU), of a computing device, that executes a preprocessing stage to generate preprocessed data comprising a partitioned graph comprising a plurality of vertices and edges, wherein each edge of the plurality of edges comprises a plurality of properties, and wherein each property of the plurality of properties has a cost; and
a graphics processing unit (GPU), of the computing device, that performs search-based metric customization using the partitioned graph to generate metric customization data for augmenting the partitioned graph with metrics encoding a cost of traversing one or more edges of the partitioned graph,
wherein the CPU is configured to:
compute the shortest path between the two locations using the preprocessed data and the metric customization data; and
output the shortest path, and
wherein the CPU sends the metric information to the GPU for use by the GPU during the metric customization, and the CPU copies metric customization data from the GPU to memory of the CPU, and wherein the GPU performing search-based metric customization comprises the GPU configured to:
copy a plurality of costs of a plurality of mapping arcs to an array;
determine a plurality of costs of a plurality of arcs of the graph from the array;
perform a search phase using the plurality of arcs and the determined plurality of costs; and
compute the metric customization data comprising a plurality of costs of shortcuts using results of the search phase.

15. The system of claim 14, wherein the CPU is configured to set up data structures on the GPU during the preprocessing stage, for use by the GPU during the metric customization.

* * * * *